United States Patent [19]

Brown

[11] 4,233,078

[45] Nov. 11, 1980

[54] REFRACTORY COMPOSITION FOR FORMING A MONOLITHIC STRUCTURE

[75] Inventor: William E. Brown, Pleasanton, Calif.

[73] Assignee: Kaiser Aluminum & Chemical Corporation, Oakland, Calif.

[21] Appl. No.: 54,506

[22] Filed: Jul. 3, 1979

[51] Int. Cl.³ .................. C04B 35/54; C04B 35/56
[52] U.S. Cl. ............................. 106/56; 106/44; 106/65; 106/67
[58] Field of Search .............. 106/56, 67, 44, 65

[56] References Cited

U.S. PATENT DOCUMENTS

| | | | |
|---|---|---|---|
| 1,458,724 | 6/1923 | Ohman | 106/56 |
| 2,658,834 | 11/1953 | Rex | 106/56 X |
| 2,836,500 | 5/1958 | Weidman | 106/67 X |
| 2,949,430 | 8/1960 | Jorgensen | 106/56 X |
| 3,303,031 | 2/1967 | Shields | 106/56 |
| 3,303,036 | 2/1967 | Coffin | 106/67 X |
| 3,627,551 | 12/1971 | Olstowski | 106/56 |
| 3,810,768 | 5/1974 | Parsons et al. | 106/56 |
| 3,842,760 | 10/1974 | Parsons et al. | 106/56 |

*Primary Examiner*—Helen M. McCarthy
*Attorney, Agent, or Firm*—Paul E. Calrow; Malcolm McQuarrie

[57] ABSTRACT

Sodium borate, preferably a hydrated sodium borate and most preferably borax (the decahydrate), is added to a graphitic refractory composition suitable for forming a refractory monolith, for example a plastic or a ramming mix, in order to reduce the loss of plasticity of the mix during storage, to inhibit fungi formation in the mix during storage, and to improve the intermediate temperature strength of the composition.

6 Claims, No Drawings

REFRACTORY COMPOSITION FOR FORMING A MONOLITHIC STRUCTURE

BACKGROUND OF THE INVENTION

This invention pertains to refractory compositions suitable for forming monolithic refractory structures, and particularly to such compositions containing graphite.

Such "graphitic" refractory compositions are well known (see U.S. Pat. Nos. 1,458,723, 1,458,724 and 3,892,584), as is the fact that the inclusion of graphite and other forms of carbon in a refractory make it "non-wetted" by molten iron, thus reducing the wear of the refractories in such applications as runners for molten iron flowing from a blast furnace. It is also known to add silicon carbide to such compositions to impart increased resistance to oxidation of the carbon. It is also known to add carbon black to such compositions to increase their plasticity, as well as adding further carbon.

However, a problem has arisen with such graphitic refractories which contain water in that they show a loss of workability during storage, particularly when they contain silicon carbide. Such effect is sometimes referred to as "aging". "Workability" is defined by ASTM standard test C-181, wherein a standard shaped specimen of the composition, for example a right cylinder, is subjected to a standard load and the amount of deformation noted; the greater the deformation, the greater the "workability" or "plasticity" of the composition. The reasons for the loss of workability during storage, particularly severe in silicon carbide containing mixes, is not completely understood, but it is believed to be due to free silicon imported into the composition by the silicon carbide reacting with the clay plasticizer in the composition to change the plasticity.

The present invention is directed to a solution of this problem of an unacceptable loss of workability or plasticity in these graphitic compositions during storage.

SUMMARY OF THE INVENTION

It has now been found, according to this invention, that a graphitic refractory showing reduced aging in the workability can be made from a composition consisting essentially of (1) from 5% to 15% graphite, (2) from 0% to 20% silicon carbide, (3) from 0 to 5% carbon black, (4) from 5% to 20% clay, (5) from 1% to 5% sodium borate, (6) from 1% to 3% of an organic binder, and (7) from 1% to 12% water, the remainder of the composition being (8) refractory aggregate chosen from high alumina material and aluminosilicate material, all percentages being by weight and based on the total dry weight of the composition.

DETAILED DESCRIPTION

The aggregate will be any of various high alumina materials such as mullite, calcined bauxite, or tabular alumina, or an aluminosilicate aggregate such as calcined flintclay or pyrophyllite. As is well-known in this art, it will be sized for good packing and maximum density, for example all being less than 3.3 mm (passing a 6 mesh screen) and 10% being smaller than 44 microns (passing a 325 mesh screen). The aggregate can be made up of different types of material, for example the coarser fractions can be tabular alumina and the finer fractions calcined alumina.

The graphite may be any such material, but will preferably have a relatively high ignition loss so as to have a high percentage of carbon and a low percentage of ash, which might impair the refractoriness of the composition. It will be sized so that substantially all is less than 0.59 mm (passes a 28 mesh screen), and may be used in either flake or amorphous form.

The silicon carbide may be also any such material, but for refractory purposes a less pure form than is used for abrasives may be used and will probably be more economical. It will be relatively finely divided, for example 75% being smaller than 44 microns (passing a 325 mesh screen).

The carbon black, when used to enhance the plasticity of the composition, can also be any of the various known forms of this material. As is generally true of carbon blacks, it will be very finely divided, substantially all being less then 44 microns (−325 mesh). The use of carbon black is desirable in a plastic mix to impart plasticity, but its use is not required in a ramming, casting or patching mix.

The clay is present as a plasticizer, and accordingly a plastic type of clay, for example plastic firecaly, or kaolin, or ballclay, will be used. Again the clay will be very finely divided, all less than 44 microns (−325 mesh).

The binder can be any of various well-known materials heretofore used in refractories. A suitable material is a lignosulfonate binder, but other organic binders can be used. It is essential that the mix not contain binders such as aluminum sulfate, which has been found to react with the borax to harden the mix within a week. The binder may be added as a dry powder, very finely divided, or as a liquid solution or suspension. In the latter case, the water used to dissolve or suspend the binder will be subtracted from the total weight of the solution added to arrive at the amount of binder added. In other words, the percent of ingredients set forth in the specification and claims are based on the dry weight of the composition (e.g., after drying at 110° C.).

The sodium borate may be any such material and will be used in finely divided form. However, it has been found that the sodium borate, for example sodium tetraborate ($Na_2B_4O_7$) is more effective in reducing the aging in workability of the composition if it is a hydrated sodium borate. Most preferably it is the fully hydrated or decahydrate form of the material ($Na_2B_4O_7 \cdot 10H_2O$), also known as borax.

The combination of a sodium compound and a boron compound, for example sodium carbonate and boric acid, is effective in giving some of the advantages of the present invention; although such combination is not as effective as borax itself, it is considered to be within the scope of the invention.

In making the compositions of this invention, the dry ingredients will be mixed first, for example in a Muller mixer, and then the wet ingredients, such as a liquid solution of binder, and the requisite amount of water to achieve the desired consistency will be added, followed by further mixing. The amount of water used will depend on the desired consistency, and will vary with the precise composition of the mix. However, in general the amount of water added will lie between 1 and 12%, dry weight basis, but the acceptable water range for any given composition will be much narrower. After making, the wet composition will be placed in moisture-proof containers for shipment to the user. Compositions according to this invention can be used in plastic form or, with a somewhat smaller amount of water, as ramming mixes.

Besides slowing the decrease of workability of these compositions in storage, the borax addition has also been found to inhibit fungi formation in the compositions (previously a serious problem) and also to increase the intermediate temperature (500° to 1200° C.) strength of monolithic pieces made with these compositions. All these advantages are obtained without impairment of refractory properties such as slag resistance.

EXAMPLE

A plastic composition was made from the following ingredients: 59.2 parts tabular alumina, all smaller than 3.3 mm (passing a 6 mesh screen); 7 parts calcined alumina finer than 44 microns (−325 mesh); 14 parts silicon carbide smaller than 74 microns (−200 mesh); 8 parts amorphous graphite; 2 parts carbon black; 6 parts plastic fireclay; 2 parts fine granular borax; and 3.8 parts of a 50% water dispersion of a calcium lignosulfonate. To these ingredients were added 5.9 parts water to give the mix a workability of 40.5%, as determined by ASTM C-181. The dry ingredients were mixed for 1 minute in a Muller mixer, followed by a further 3 minutes mixing after adding the liquids.

After 28 days storage in sealed polyethylene bags this mix showed a workability of 26.2% by the same test and no mold growth. When used to line a 6.4 cm inner diameter rotary slag test furnace and subjected to the flow of about 6 kg of blast furnace slag at a temperature of 1550° C. over a period of 2.5 hours, this composition showed a corrosion rate of 0.13″ (3.3 mm) per hour.

A comparison composition was made in exactly the same way except that the borax was omitted. After tempering with 6.1 parts water, this comparison composition had a workability of 44.2% by the same ASTM test. However, after 28 days storage, the comparison composition had a workability of only 9%, an unacceptably low value (i.e., this comparison composition was not usable after this length of storage). Furthermore, the comparison composition showed mold growth during storage. Such growth is undesirable not only because of its poor appearance and odor, but also because it impairs workability and is believed to impair properties and performance of the mix in use. When subjected to the same rotary slag test, the comparison composition showed exactly the same corrosion rate as the preceding example.

Another composition within the scope of this invention was made in the same way as the first example except that it contained one part dehydrated granular borax and 7 parts graphite. After tempering with 5.9 parts water, the plastic mix was formed into bars 23×6.4×5.7 cm (9×2.5×2.25 inches) and subjected to reheat tests.

A second comparison composition, containing 8 parts graphite and no borax, was also made, tempered with 5.4 parts water, and also formed into bars.

Although the two compositions were formed to substantially the same density, the composition with borax showed slightly increased densities after reheating to temperatures from 1500° to 2732° F. (814° to 1500° C.). More importantly, the composition with borax showed increased modulus of rupture and cold crushing strengths after being reheated to temperatures from 1500° to 2000° F. (814° to 1090° C.). The composition with borax showed slightly lower porosity (1 to 2%) than that without, ranging from 24 to 29 volume percent after reheating at temperatures from 1500° F. to 2910° F. (814° to 1600° C.).

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 200 mesh screen opening corresponds to 74 microns, and 325 mesh to 44 microns.

I claim:

1. A refractory composition for forming a monolithic structure consisting essentially of (1) from 5% to 15% graphite, (2) from 0% to 20% silicon carbide, (3) from 0 to 5% carbon black, (4) from 5% to 20% clay, (5) from 1% to 5% sodium borate, (6) from 1% to 3% of an organic binder, and (7) from 1% to 12% water, the remainder of the composition being (8) refractory aggregate chosen from high alumina material and aluminosilicate material, all percentages being by weight and based on the total dry weight of the composition which composition has a substantially reduced loss of workability or plasticity during storage in a sealed container.

2. Composition according to claim 1 wherein the sodium borate is sodium tetraborate.

3. Composition according to claim 2 wherein the sodium tetraborate is hydrated.

4. Composition according to claim 3 wherein the hydrated sodium tetraborate is borax, $Na_2B_4O_7.10H_2O$.

5. Composition according to claim 4 containing about 2% borax.

6. Composition according to claim 1, 2, 3, 4 or 5 wherein the refractory aggregate is a high alumina material.

* * * * *